C. M. LEECH.
VARIABLE SPEED TRANSMISSION GEARING.
APPLICATION FILED JULY 19, 1911.
1,033,599.
Patented July 23, 1912.
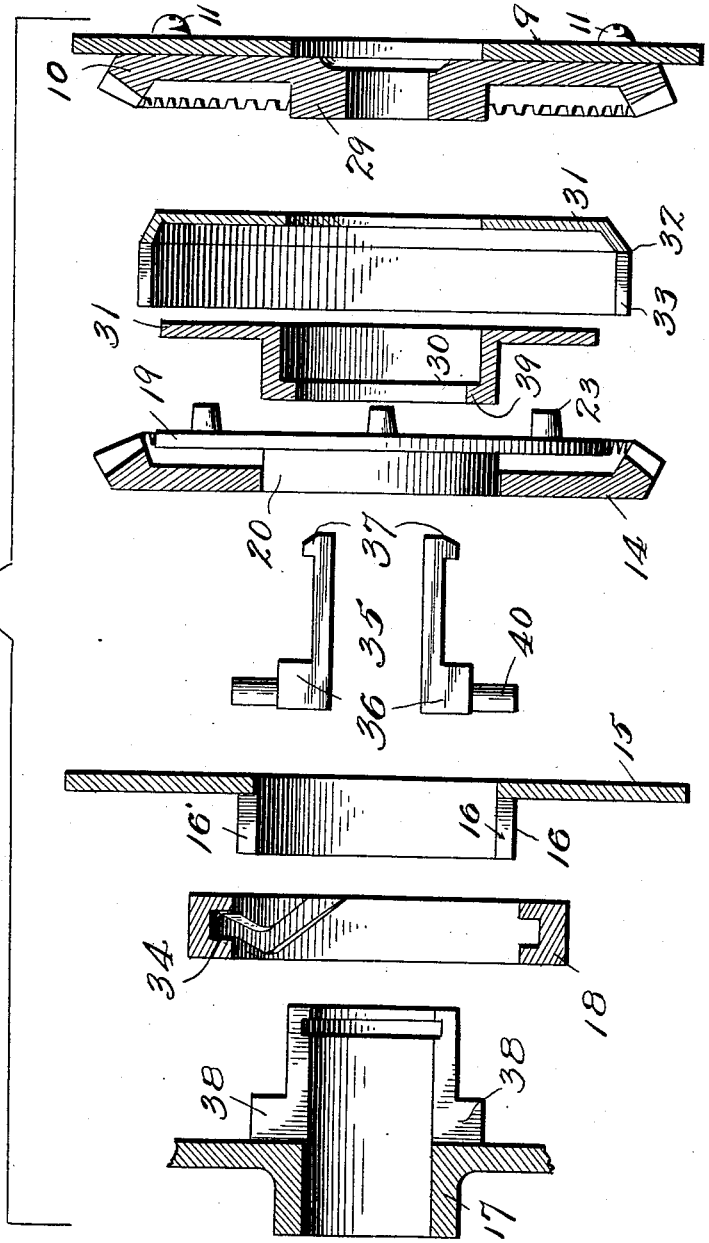

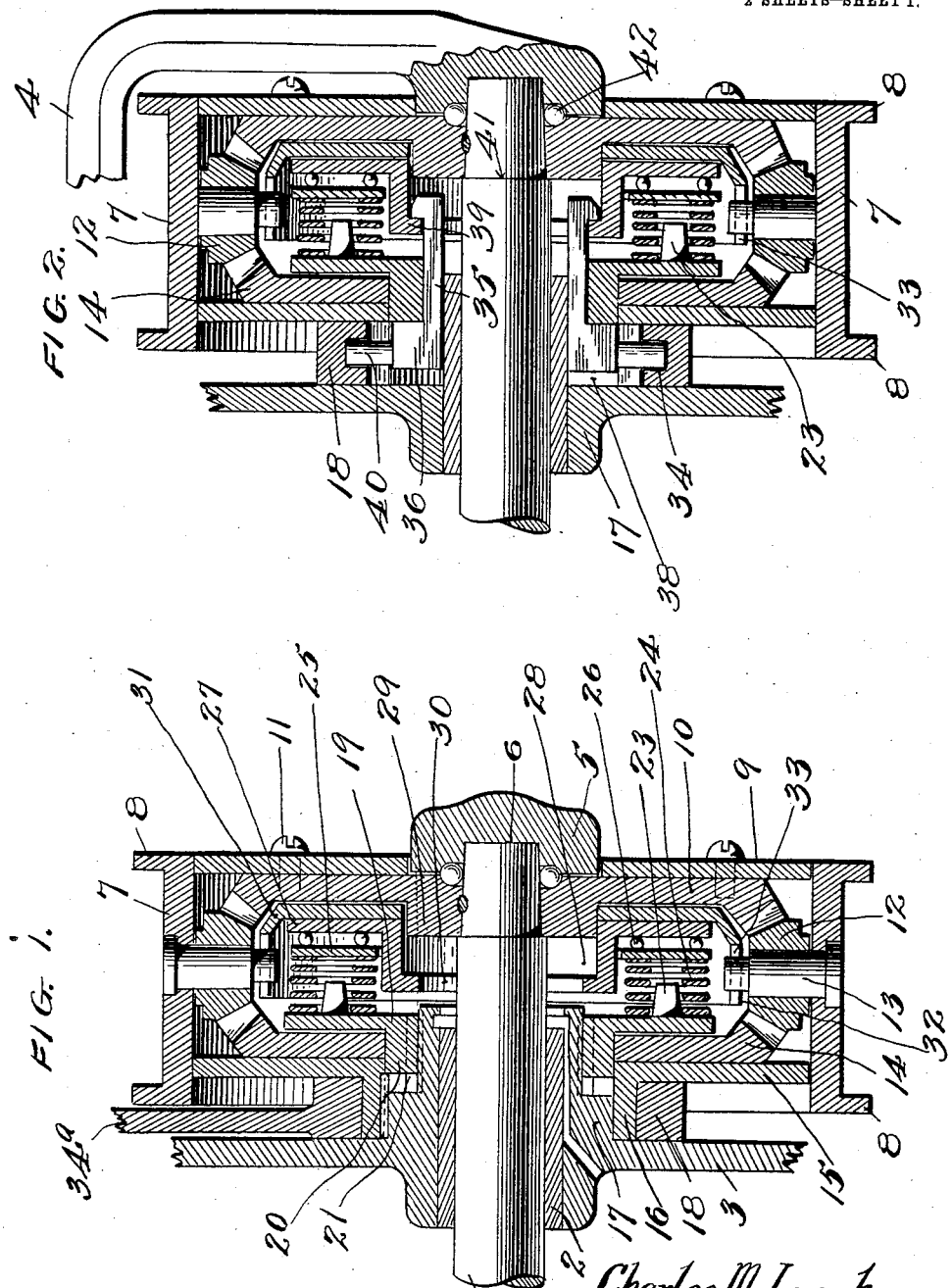

UNITED STATES PATENT OFFICE.

CHARLES M. LEECH, OF LIMA, OHIO.

VARIABLE-SPEED TRANSMISSION-GEARING.

1,033,599. Specification of Letters Patent. Patented July 23, 1912.

Application filed July 19, 1911. Serial No. 639,328.

*To all whom it may concern:*

Be it known that I, CHARLES M. LEECH, a citizen of the United States, residing at Lima, in the county of Allen and State of Ohio, have invented certain new and useful Improvements in Variable-Speed Transmission-Gearing, of which the following is a specification.

This invention relates to a variable speed transmission gearing and particularly to such a device adapted for use in connection with a motor-cycle or other vehicle employing two forward speeds.

An important object of this invention is to provide a transmission gearing, for driving elements at forward low and high speeds from a source of rotary power, which is easy to operate, compact, and durable.

A further object of my invention is to provide means of the above mentioned character, which is neat in appearance, small, cheap to manufacture, and not liable to derangements.

Other objects and advantages of this invention will be apparent during the course of the following description.

In the accompanying drawings forming a part of this specification and in which like numerals are employed to designate like parts throughout the same, Figure 1 is a central vertical sectional view through the device, Fig. 2 is a horizontal sectional view through the same, and, Fig. 3 is a view similar to Fig. 2, showing the elements separated and positioned to be assembled.

In the drawings wherein is illustrated a preferred embodiment of my invention, the numeral 1 designates a crank-shaft of an engine (not shown) which is journaled in a bearing 2, held in an opening formed in a crank-case 3. Rigidly attached to the crank-case is a horizontal arm 4, carrying a cylindrical head 5, which is provided with an opening 6 to rotatably receive the free end of the crank-shaft 1.

The numeral 7 designates a ring, having spaced flanges 8 and serving as the periphery of a belt pulley. This ring 7 receives its rotation from the crank-shaft 1, through the medium of elements to be described.

Rotatably mounted upon the head 5 is a ring 9, having a driving bevel-gear 10 positioned in engagement with its inner face and rigidly attached thereto by screws 11, or the like. This driving bevel-gear is keyed to the shaft 1, and permanently meshes with planetary bevel-gears 12, rotatably mounted upon stub-shafts 13, which are rigidly attached to the inner face of the ring 7. Disposed in opposition to the driving bevel-gear 10 is a locking annular gear 14, which permanently meshes with the planetary bevel-gears 12. An annular friction disk 15 slidably engages the outer face of the locking gear 14, and is provided at its center with an annular flange 16, which is splined upon hub 17 of the crank-case and provided with slots 16'. A shifting ring 18 is pivotally mounted upon the flange 16 and is interposed between the friction disk 15 and the crank-case 3.

Disposed for movement into and out of engagement with the inner face of the locking gear 14, is an inner annular friction disk 19, provided at its center with an annular flange 20, which is splined upon the hub 17, as shown at 21. The friction disk 19 is capable of moving longitudinally of the hub 17 but cannot revolve thereon. The locking gear 14 is rotatably mounted upon the annular flange 20. The inner friction disk 19 carries upon its inner face a plurality of inwardly extending pins 23, upon which are mounted compressible coil springs 24, engaging a ring 25. The ring 25 engages balls 26, which engage a second inner circular friction disk 27. This disk 27 has a hollow hub portion 28, which is rotatably mounted upon the hub portion 29 of the bevel-gear 10 and provided with a central opening 30, to receive the crank-shaft 1. A locking friction disk 31 is rotatably mounted upon the hub portion 29, is disposed between the bevel-gear 10 and the friction disk 27, and is provided at its periphery with an inwardly extending flange 32. This flange 32 is provided with slots 33 to rotatably receive the inner ends of the stub-shafts 13.

The shifting ring 18 is provided upon its inner face with diametrically disposed grooves 34 (see Fig. 3), each of which is approximately V-shaped and diverges toward the friction disk 15, to pass through the edge of the ring 18. A controlling lever 34ª is rigidly attached to the ring 18 and is employed to turn the same. The numeral 35 designates diametrically disposed shifting fingers or elements having shoulders 36 at the outer ends and heads 37 at their inner ends. The shifting fingers or elements 35 are longitudinally movably mounted through openings 38 formed in the hub portion 17. The heads 37 engage an annular flange 39 formed on the hub portion 28 and the shoulders 36 carry radially extending pins 40, operating in the slots 34. The crank-shaft 1 is provided near its free end with a shoulder 41, engaging the hub portion 29. Balls 42 are interposed between the hub portion 29 and the head 5.

Attention is called to the fact that the operating elements of the mechanism are disposed between the plate 9 and disk 15 and within the pulley ring 7, whereby they are housed and completely protected.

The operation of the mechanism is as follows:—The crank-shaft 1 is continuously rotated in the direction of the arrow. When the controlling lever 34$^a$ is in its neutral position, the bevel-gear 10 is rotated by the crank-shaft and imparts its rotation to the planetary bevel-gears 12, which in turn rotate the locking annular gear 14. It is thus seen that the rotation of the crank-shaft 1 is not imparted to the pulley ring. When the controlling lever is swung forwardly to low speed position, the shifting ring 18 is turned and the shifting fingers or elements 35 are moved longitudinally to the left. By this movement of the shifting fingers or elements 35, the inner friction disk 27 is moved to the left and through the medium of the springs 24 moves the friction disk 19 into engagement with the locking annular gear 14. This gear 14 is now held against rotation, and the rotating bevel-gear 10 causes the planetary bevel-gears 12 to rotate and travel about the now stationary gear 14. In their travel around the now stationary gear 14, the planetary bevel-gears 12 carry the pulley ring 7 with them and accordingly rotate it forwardly at one-half the speed of rotation of the driving gear 10. When the controlling lever 34$^a$ is swung forwardly to occupy its forward high speed position, the shifting ring 18 is further turned in the same direction and the same will now move the shifting fingers or elements 35 longitudinally to the right. Upon this movement of these shifting fingers or elements, the inner friction disk 19 will be moved to the right and through the medium of the springs 24 will force the inner friction disk 27 into locking engagement with the friction locking disk 31, clamping the same against the driving gear 10 to prevent its rotation with relation to the bevel-gear 10. The gear 14 is now free to rotate. The rotation of the driving bevel-gear 10 is now imparted to the locking disk 31, the same being rotated at forward high speed and carrying with it the stub shafts 13, whereby the pulley ring 7 is rotated at forward high speed. From the description of the above referred to parts, it is obvious that the elements 10, 31, 27, 12, 15 and 7 all rotate together at forward high speed. When the controlling lever is swung to the rear the pulley ring 7 is first driven at forward low speed and when the controlling lever is returned to its neutral position the rotation of the pulley ring 7 is suspended.

I wish it understood that the form of my invention herewith shown and described is to be taken as a preferred example of the same and that certain changes in the shape, size and arrangement of parts may be resorted to without departing from the spirit of the invention or the scope of the subjoined claims.

Having thus described my invention, I claim:—

1. In mechanism of the character described, an annular driven element, a planetary gear mounted upon the inner surface thereof, a driving gear disposed within the annular element upon one side of the planetary gear to engage the same, a locking gear disposed within the annular element upon the opposite side of the planetary gear to engage the same, and means disposed between the driving gear and the locking gear to lock said driving gear with the annular driven element and to hold said locking gear against rotation.

2. In mechanism of the character described, an annular driven element, a stub shaft carried thereby, a planetary gear carried by the stub shaft, a driving gear engaging the planetary gear, a disk normally slidably engaging the driving gear and having connection with the stub shaft, a locking gear engaging the planetary gear, a disk fixed against rotation and normally slidably engaging said locking gear, and shifting means disposed between the first named disk and locking gear.

3. In mechanism of the character described, a rotating element, a driven element, a stub shaft carried by the driven element, a planetary gear rotatable upon the stub-shaft and engaging the rotating element, means normally rotatable with relation to said rotating element and engaging the stub-shaft, to control the rotation of said stub-shaft about said rotating element, means for clamping the first named means to the rotating element, a normally rotatable element engaging the planetary gear, and means for holding said normally rotatable element against rotation.

4. In mechanism of the character described, a rotating element, a driven element, a stub-shaft carried by the driven element, a planetary gear rotatable upon the stub-shaft and engaging the rotating element, means normally rotatable with relation to said rotating element and engaging the stub-shaft, to control the rotation of said stub-shaft about said rotating element, a friction element slidably engaging said means, a normally rotatable element engaging the planetary gear, a friction element engaging said normally rotatable element, and means to shift said friction elements.

5. In mechanism of the character described, a rotating element, a driven element, a stub-shaft carried by the driven element, a planetary gear rotatable upon the stub-shaft and engaging the rotating element, a disk slidably engaging and normally rotatable with relation to said rotating element and engaging the stub-shaft, a normally rotatable element engaging said planetary gear, friction disks disposed between the first named disk and the normally rotatable element, a spring disposed between the last named disks, and means to shift the last named disks.

6. In mechanism of the character described, a rotating element, a driven element, a stub-shaft carried by the driven element, a planetary gear rotatable upon the stub-shaft and engaging the rotating element, a disk slidably engaging and normally rotatable with relation to said rotating element and engaging the stub-shaft, a normally rotatable element engaging said planetary gear, a friction disk disposed between the first named disk and the normally rotatable element, a spring disposed between the last named disks, a shifting element engaging the last named disks, and having a pin formed thereon, and a shifting ring having a groove formed therein for receiving said pin.

In testimony whereof I affix my signature in presence of two witnesses.

CHARLES M. LEECH.

Witnesses:
 EARL NILES,
 CLARENCE C. MILLER.

Copies of this patent may be obtained for five cents each, by addressing the "Commissioner of Patents, Washington, D. C."